May 19, 1964
D. C. HALSEY ETAL
3,133,611
VEHICLE SPEED CONTROL
Filed July 20, 1962
6 Sheets-Sheet 2
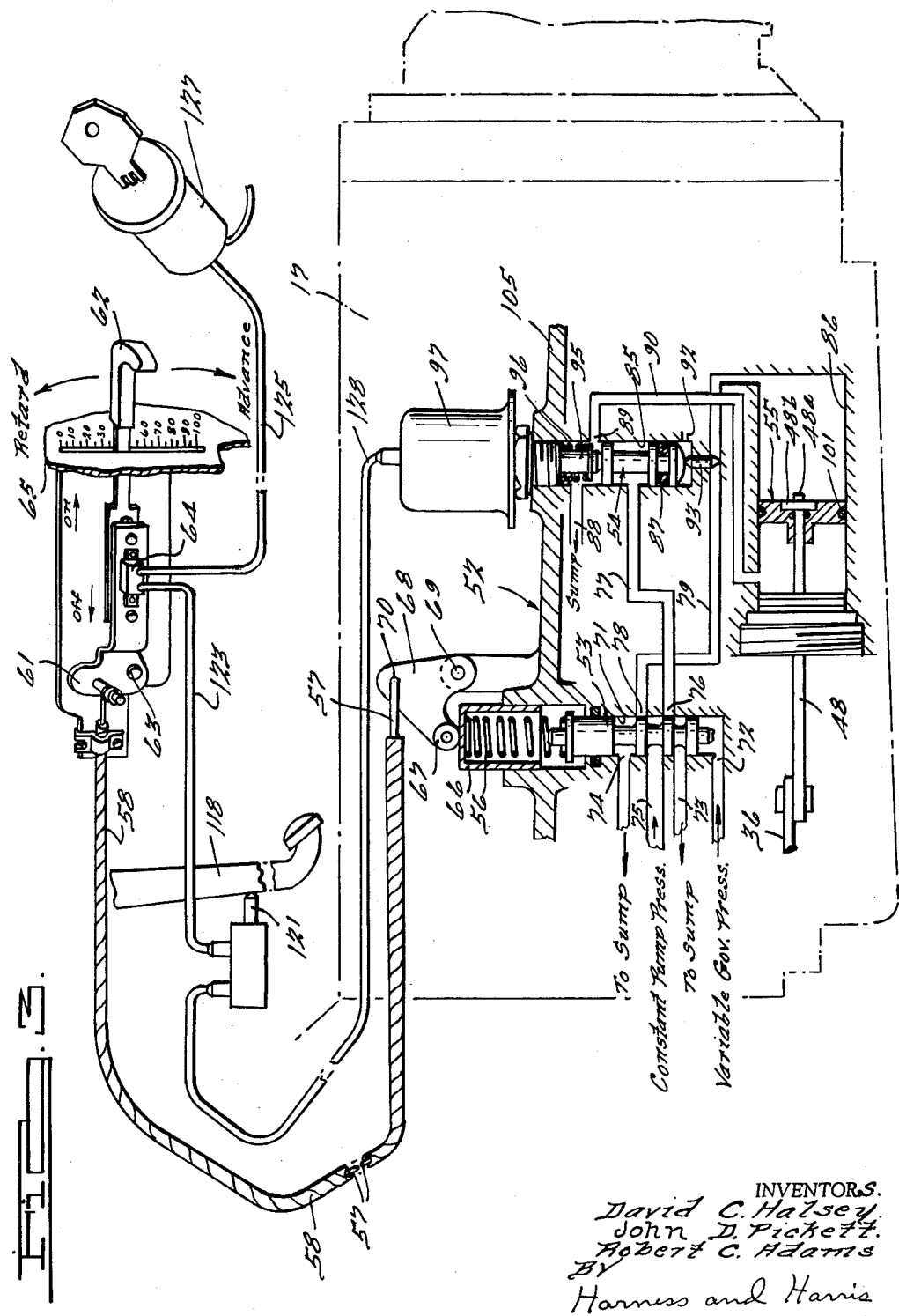
INVENTORS.
David C. Halsey,
John D. Pickett,
Robert C. Adams
BY
Harness and Harris
ATTORNEYS.

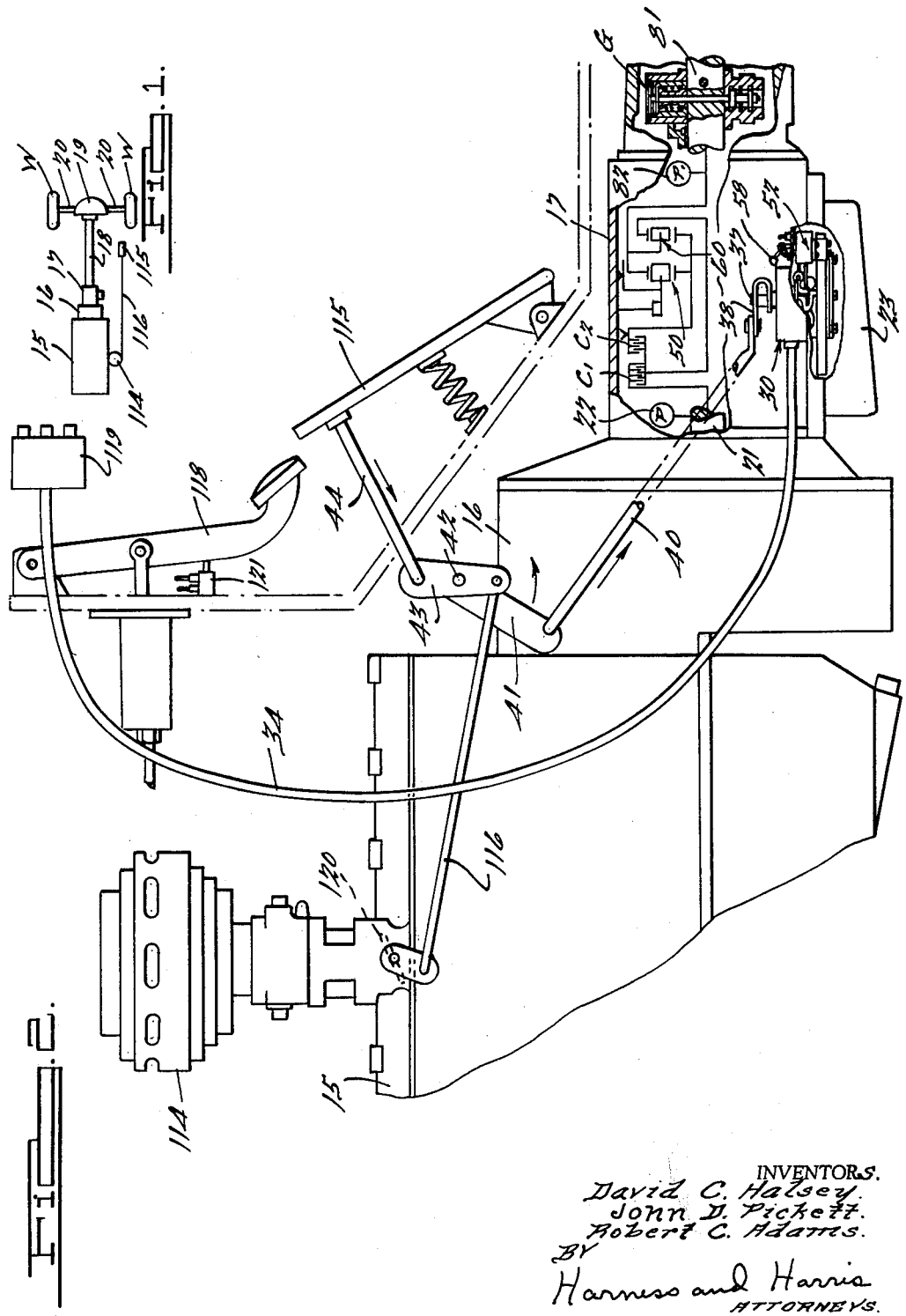

May 19, 1964
D. C. HALSEY ETAL
3,133,611
VEHICLE SPEED CONTROL
Filed July 20, 1962
6 Sheets-Sheet 3
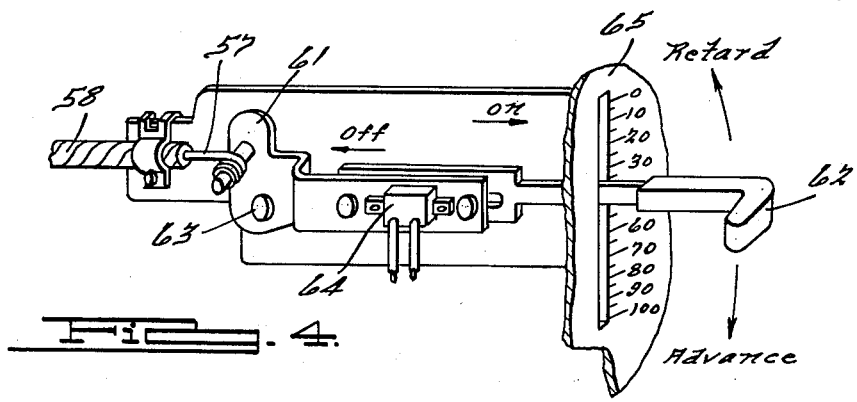
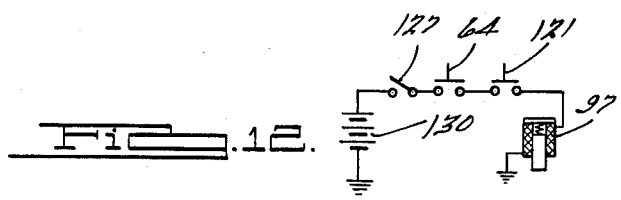
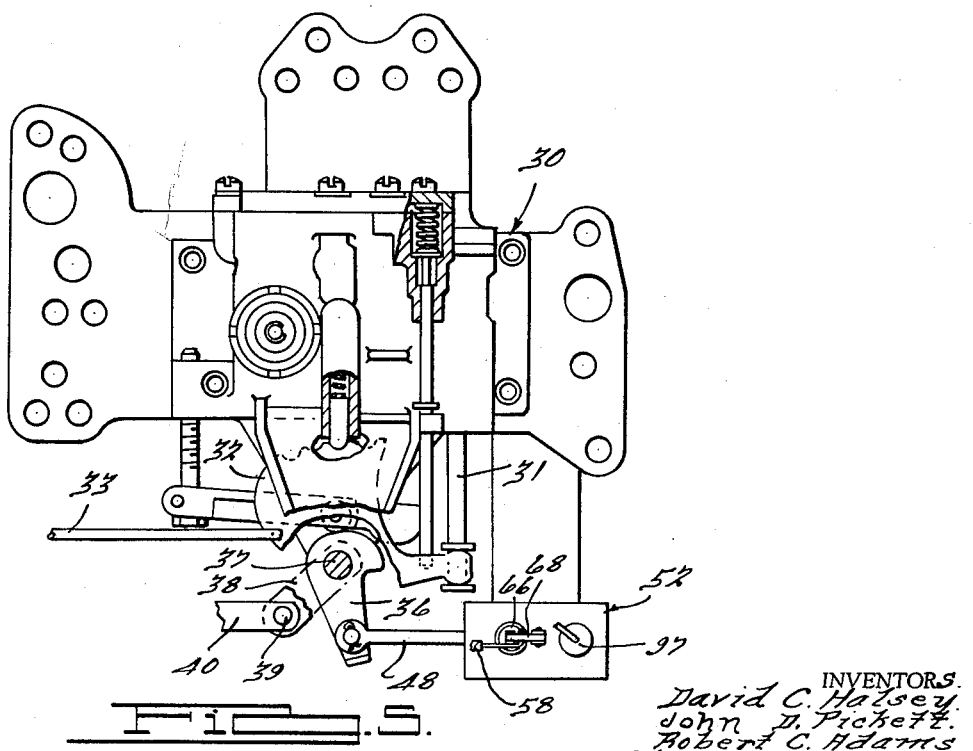
INVENTORS.
David C. Halsey.
John D. Pickett.
Robert C. Adams.
BY
Harness and Harris
ATTORNEYS.

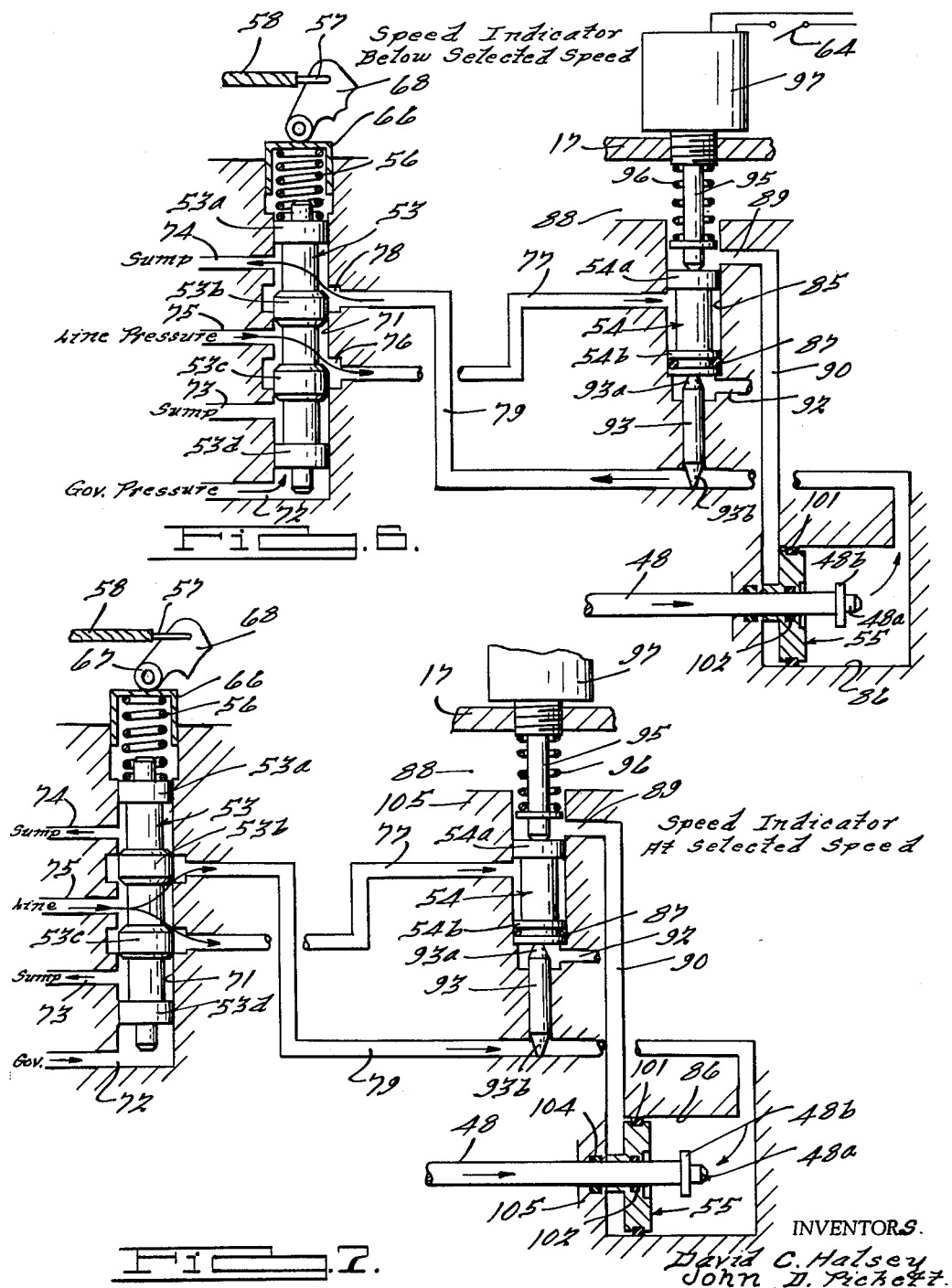

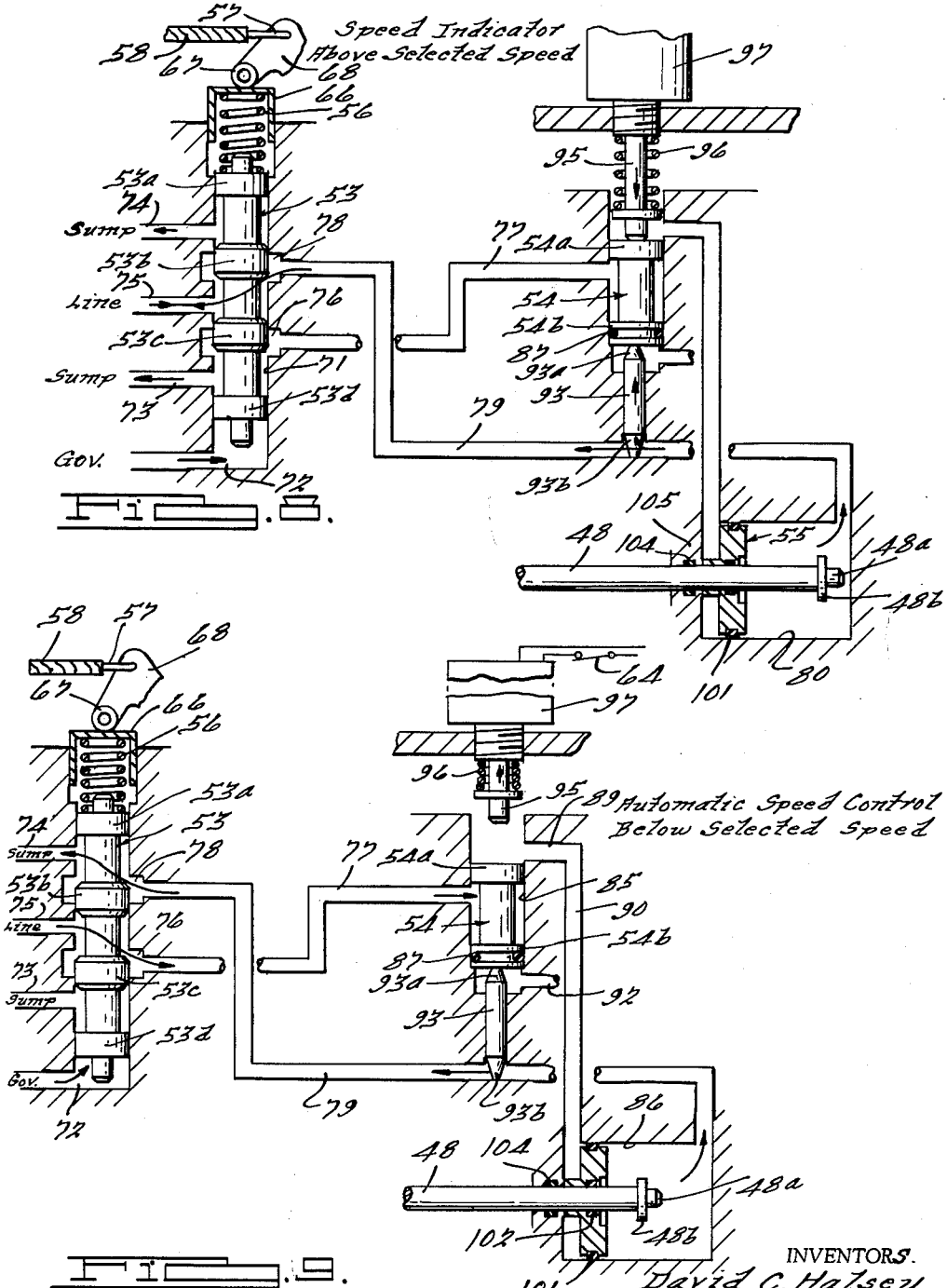

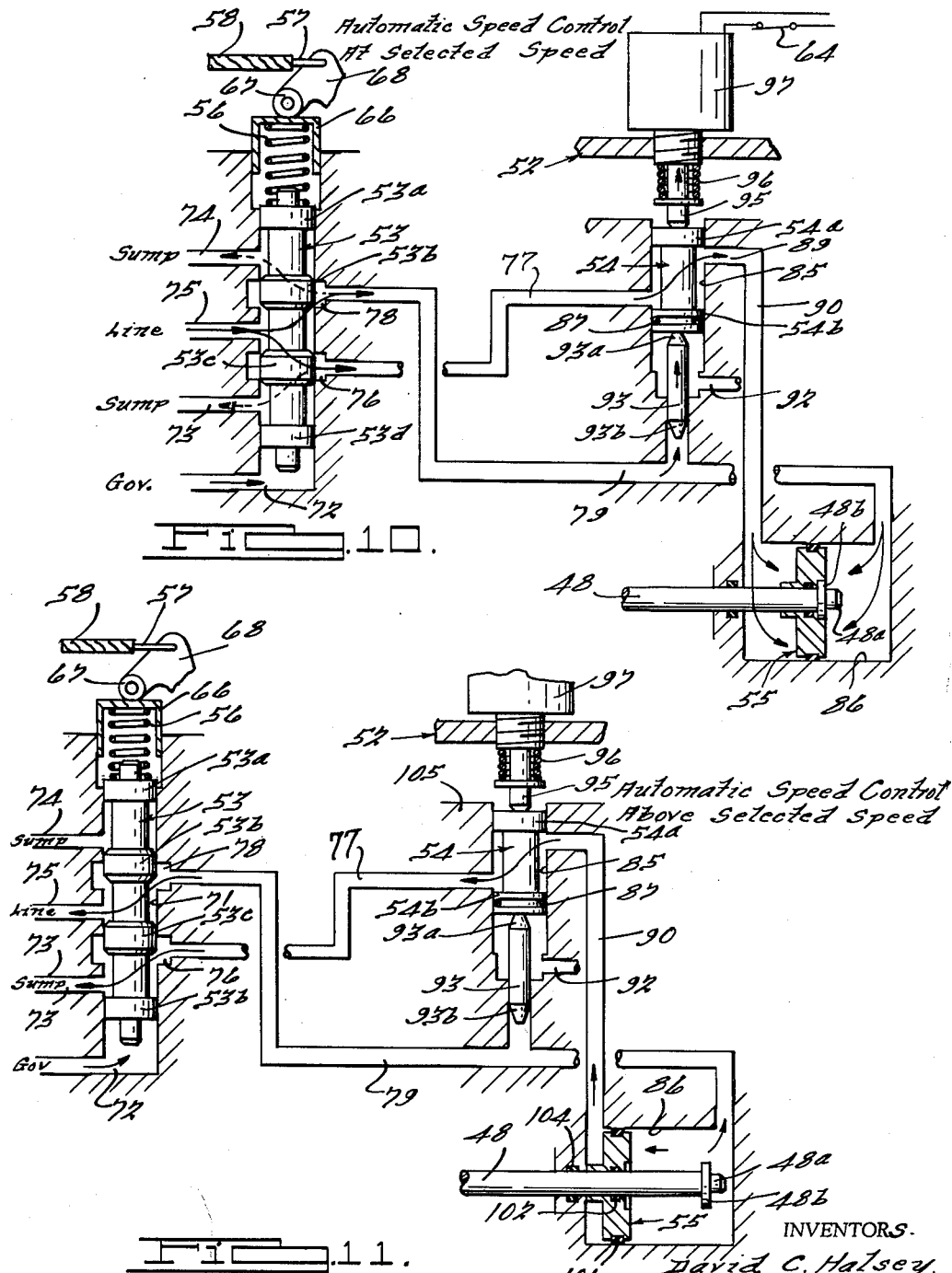

United States Patent Office 3,133,611
Patented May 19, 1964

3,133,611
VEHICLE SPEED CONTROL
David C. Halsey, Birmingham, Robert C. Adams, Royal Oak, and John D. Pickett, Waterford, Mich., assignors to Chrysler Corporation, Highland Park, Mich., a corporation of Delaware
Filed July 20, 1962, Ser. No. 211,182
14 Claims. (Cl. 180—82.1)

This invention relates to a vehicle speed control device and particularly to a speed control that will function as either a vehicle speed warning device or as an automatic speed control to maintain any preselected vehicle speed under varying road conditions.

It is a prime object of this invention to provide a simplified, reduced cost, vehicle speed warning device and automatic vehicle speed control that is particularly adapted for association with a vehicle drive train automatic transmission having fluid pressure operated control mechanisms.

It is still another object of this invention to provide a combination vehicle speed warning device and automatic speed control that is designed to utilize the existing pump pressure and a vehicle speed responsive pressure of a conventional automatic transmission control system as the operating medium for the speed warning and speed control device.

It is still another object of this invention to provide a speed warning and speed control device that is readily attachable to any fluid pressure controlled automatic transmission or other vehicle mounted device having a source of relatively constant fluid pressure and a source of fluid pressure substantially responsive to the vehicle speed.

It is a further object of this invention to provide an improved type of pressure fluid operated vehicle speed control device that will (1) automatically maintain a vehicle operating at a predetermined speed or, in the alternative (2) give a warning to the vehicle operator, by increasing the resistance to accelerator depression, when a predetermined vehicle speed has been attained without holding the vehicle at the preselected speed and without preventing or interfering with intentional override of this accelerator pedal resistance so that increased speed can be attained for emergency maneuvering by further accelerator depression.

It is still another object of this invention to provide a low cost, small size, hydraulically operated, combination speed warning indicator and automatic speed control device that can be readily applied to the casing of substantially any hydraulically operated automatic transmission either as original equipment or as optional accessory equiment.

It is a further object of this invention to provide a hydraulically operated, combination speed warning indicator, and automatic speed control device for motor vehicles having hydraulically operated transmission controls including a source of substantially constant pressure fluid and a source of variable pressure fluid responsive to vehicle speed.

It is still a further object of this invention to provide a fluid pressure operated combination speed warning indicator and automatic speed control device for a motor vehicle wherein the device can be mounted within the vehicle transmission case and operated by the same pressure fluids that operate the vehicle transmission controls.

It is still another object of this invention to provide a combination vehicle speed warning indicator and automatic speed control that can also be used as a hand operated throttle control under certain circumstances.

Other objects and advantages of this invention will be readily apparent from a reading of the following description and a consideration of the related drawings wherein:

FIG. 1 is a schematic view of a motor vehicle drive train having a fluid pressure operated automatic transmission to which this invention has been added;

FIG. 2 is a fragmentary side elevational view, partly in section, of a vehicle drive train to which this invention has been applied;

FIG. 3 is an enlarged fragmentary view of that portion of the FIG. 2 drive train that specifically embodies this invention;

FIG. 4 is an enlarged, fragmentary, sectional elevational view of the speed setting control for the mechanism embodying this invention;

FIG. 5 is a plan elevational view of the control valve assembly of the automatic transmission embodying this invention, portions being shown broken away and in section for the sake of clarity;

FIG. 6 is a fragmentary sectional elevational view schematically showing the valving of this speed control unit when it is being used as a speed sensing or governor unit with the valving in the positions it would assume before the vehicle has been brought up to the control speed;

FIG. 7 is a fragmentary schematic view similar to FIG. 6 but showing the position of the speed control unit valving when the unit is used as a speed sensing unit and the vehicle is traveling at the preset control speed;

FIG. 8 is a fragmentary schematic view similar to FIGS. 6 and 7 but showing the position of the speed control unit valving when the unit is used as a speed sensing unit and the vehicle is traveling above the preset control speed;

FIG. 9 is a fragmentary sectional elevational view schematically showing the valving of this speed control unit when the unit is being used as an automatic speed control device with the vehicle not yet up to the preselected control speed;

FIG. 10 is a fragmentary schematic view similar to FIG. 9 but showing the speed control unit valving when the unit is used as an automatic speed control device with the vehicle traveling at the preset control speed;

FIG. 11 is a fragmentary schematic view similar to FIGS. 9 and 10 showing the speed control unit valving when the unit is being used as an automatic speed control device with the vehicle traveling above the preset control speed; and FIG. 12 is a schematic view of the electrical control circuit for the solenoid operated valve of the automatic speed control unit.

With the development of super-highways and/or expressways having limited access drives, it is now possible to travel for extended periods of time without having to bring the motor vehicle to a stop or to exercise any manual control over the vehicle other than steering, speed control and occasional braking. The majority of current model motor vehicles include automatic transmissions to effect the changes in speed ratio drive and these automatic transmissions usually include a source of substantially constant pressure fluid called "line pressure" and a source of variable pressure called "governor pressure" which is substantially proportional to the speed of the vehicle. Because these two types of pressure fluid are available on practically all present-day automobile automatic transmissions, it has been possible to develop an improved, low cost, automatic speed control and speed sensing device that can be readily added to most automatic transmissions either as accessory equipment or original equipment. This new type of automatic speed control and speed sensing device is not only adapted for use during extended expressway driving where constant manual control of the vehicle speed may be quite tiring, but in addition, this control can be used as a speed sensing governor to advise the vehicle operator when he or she reaches any pre-selected speed so as to prevent unintentional exceeding of the speed limit. Because existing pressure fluids of the transmission control system can be used as the operating means for this speed control unit, the cost of the unit can be greatly reduced from that charged for those speed control devices that now use expensive reversible electric motors or vacuum operated motors to provide the speed control operating means. Furthermore, because this unit is simple and relatively small in size, it can be mounted within the automatic transmission housing where it will be protected and where leakages of the operating fluids will not cause any real problem. Location of the speed control unit within the transmission housing also eliminates the need for any external pressure fluid conduits as the various fluid passages of this control unit are essentially cored openings in the valve block unit that is attached to the interior of the transmission housing.

While this device will function as an automatic speed control and also as a speed sensing unit, still it is designed in such a manner that it will not initially bring the vehicle up to the preselected speed but merely maintain the preselected speed once it is attained by the operator. Secondly, the automatic speed control must release its control of the accelerator pedal on application of the vehicle service brakes. Thirdly, the automatic speed control must be rendered inoperative when the vehicle is stopped or placed in reverse gear so that it must be manually reset to again become operative.

FIG. 1 of the drawings diagrammatically discloses a motor vehicle power plant and drive train comprising an internal combustion engine 15 drivingly connected to a power transmission unit that consists of a hydrokinetic type of torque converter device 16 drivingly connected to a change speed gear box 17. The ouptut from the gear box 17 drives a propeller or drive shaft 18 that transmits drive through a rear axle differential unit 19 to axles 20 that drive the road wheels W. The engine 15 has a carburetor 114 that is controlled by an accelerator pedal 115 through a linkage connection 116.

FIG. 2 of the drawings shows to a larger scale the engine driven power transmission unit 16, 17 as well as the accelerator pedal operated throttle valve linkage 115, 44—42, 116, the vehicle service brake pedal 118 and the transmission gear ratio selector mechanism 119. This view also shows the carburetor throttle valve 120 that is actuated by the accelerator pedal 115 through its associated linkage 116. From FIG. 2 it will also be noted that the engine 15 that drives the torque converter 16 transmits drive to the gear box 17 through the torque converter output shaft 21. The torque converter output shaft 21 is the input to the planetary type, multi-speed transmission gear box 17. Drivingly connected to the gear box input shaft 21 is a pressure fluid pump 22. The pump 22 draws oil from the sump 23 at the bottom of the transmission gear box 17 and circulates oil through the torque converter and the transmission for both lubrication, servo and control purposes. The complete lubrication and control system for an engine driven hydraulic transmission unit of the disclosed type is shown in L. E. Froslie Patent 3,000,230 dated September 19, 1961. As the details of the transmission and torque converter do not form a part of this invention, it is not thought that additional description thereof is required other than a brief explanation relative to the diagrammatic representation of the transmission as shown in FIG. 2.

The gear box 17 includes the forward drive clutch $C_1$, the direct drive clutch $C_2$ and the pair of planetary gear trains 50 and 60 that are adapted to cooperate with the torque converter device 16 to provide means for the transmission of three forward speed drives and a reverse drive to the output shaft 81 that is drivingly connected to the vehicle propeller shaft 18. The transmission output shaft 81 has drivingly connected thereto a pump 82 that also draws its oil supply from the transmission sump 23.

This rear pump and its associated conduit mechanism is also shown in the aforementioned Froslie patent 3,000,230 and it serves the same lubrication, servo and control functions as front pump 22. From the foregoing description it is thought to be clear that this transmission device includes a front pump 22 that is driven by the vehicle engine 15 and is therefore responsive to engine speed while the rear pump 82 that is driven by the transmission output shaft is responsive to the output shaft or vehicle speed. It is usually rear pump 82 that is utilized to supply "line" pressure to the output mounted shaft governor device G which modulates the "line" pressure in accordance with vehicle speed to provide the transmission and associated hydraulically operated mechanisms with a pressure fluid that is substantially directly proportional to the vehicle speed. The particular governor mechanism G that provides the vehicle speed responsive fluid, commonly called "governor" pressure, is shown in detail in the patent to W. L. Sheppard 2,697,363 dated Dec. 21, 1954. For the purposes of this disclosure, it is thought that the showing in FIG. 2 is sufficient to indicate that pumps 22 and 82 are suitable to supply a source of pressure fluid that can be substantially constant in intensity whereas the governor device G is suitable to supply a source of pressure fluid that is substantially proportional to vehicle speed. It is this constant intensity pressure fluid, denoted "line" pressure and the variable vehicle speed responsive pressure, normally denoted "governor" pressure that is utilized to provide the operating media for this speed control device.

The transmission gear box shown in FIG. 2 has a valve body 30 that is bolted to the underside of the gear box casing and positioned within the oil sump 23. This valve body 30, which is shown in plan view in FIG. 5, includes a speed ratio selector valve (not shown) that is actuated by the valve stem 31. Valve stem 31 is connected to a rotatable segment 32 that is arranged to be actuated by the cable 33. Cable 33 is a part of the Bowden wire assembly 34 (FIG. 2) that is operatively connected to the pushbutton assembly 119 mounted in the vehicle operator's compartment. It is the rotation of the segment 32 through actuation of the pushbuttons of assembly 119 that selects the various vehicle speed ratio drives. This operation is more fully explained in the aforementioned L. E. Froslie Patent 3,00,230. Additional explanation of the speed ratio selector mechanism is not thought to be required for an understanding of this invention.

Valve body 30 (see FIG. 5) also includes a throttle pressure valve (not shown) that is actuated by the rotatable cam lever 36. Details of throttle pressure valve are shown in J. T. Ball et al. Patent 2,849,889. Cam lever 36 is fixed to the rotatable shaft 37 that also carries the lever arm 38. Lever arm 38 is connected by pin 39 to a link 40 (see FIG. 2). Link 40 is connected by lever 41 to a shaft 42. Shaft 42 carries the crank 43 that has one end connected by the link 44 to the accelerator 115. The other end of crank 43 is connected to the carburetor throttle valve actuating linkage 116. From the foregoing description it is thought to be clear that depression of the accelerator pedal 115 will rotate crank 43 and lever 41 counter clockwise which movement is transmitted by linkage 40, 38 to the shaft 37 and the cam lever 36. Lever 36 has a piston stem 48 pinned thereto such that the accelerator pedal movement is transmitted to the piston 48 of the fluid pressure operated speed sensing and control device 52 that embodies this invention.

The pressure fluid operated speed sensing and control device 52 (see FIG. 3) is essentially a valve body that includes a manually adjustable speed control valve 53, a solenoid controlled valve 54 and a differential pressure actuated piston 55. The manually adjustable valve 53 is arranged to have a load or force applied to its upper end through the spring 56 that is arranged to be compressed and expanded by the movement of the cable 57 of the Bowden wire assembly 58. The wire or cable 57 is connected to an adjusting lever 61 that is pivotally mounted within the vehicle operator's compartment. Lever 61 has a control handle 62 connected thereto to provide for rotation of the lever 61 about its pivot 63. Handle 62 is shiftably mounted on lever 61 so that it can be moved in and out as indicated by the indicia in FIG. 4 so as to open and close an electrical switch 64. As the handle 62 is swung about pivot 63 a particular control speed is selected on the graduated scale 65 through which the handle 62 projects. The position of the handle 62 determines the degree of compression stress or load applied to the spring 56 through cable 57. This spring load acts to urge the valve 53 downwardly. The spring 56 is capped by a shoe 66 that is arranged to be actuated by the roller follower 67 on pivotally mounted lever plate 68. Lever plate 68 is swung about its pivot 69 by the cable 57 that is connected thereto at 70.

Looking first at FIG. 3, it will be seen that the bore 71, that mounts the manually adjustable speed responsive valve 53, has a port 72 at its lower end that is connected to a source of vehicle speed responsive pressure fluid such as the "governor" pressure supplied by the output from the drive shaft hydraulic governor G (FIG. 2). The force of the "governor" pressure fluid applied to the lower end of valve 53 is opposed by the spring force applied to the upper end of valve 53 as a result of operation of the control handle 62. Also connected to the bore 71 for valve 53 are two spaced apart ports 73 and 74 that empty into the fluid sump 23. Connected to the valve bore 71 between the spaced apart sump ports 73 and 74 is a "line" pressure supply port 75. The port 75 is adapted to be supplied with a substantially constant intensity pressure fluid such as that provided by the engine driven or drive shaft driven pumps 22 and 82 respectively. The output of these pumps is controlled by a pressure regulator valve (not shown) that usually provides a "line" pressure of around 90 p.s.i. when the transmission is operating in a forward drive ratio. The valve 53 is of the multiple spool type and includes the spaced lands 53a, 53b, 53c and 53d that are interconnected by reduced diameter neck portions. Branching off from the valve bore 71 is a port 76 that is connected to a conduit 77 that leads to the bore 85 for the solenoid operated valve 54. Also branching off from the valve bore 71 is a port 78 that is connected by the conduit 79 to the bore 86 for the differential pressure operated piston 55.

The solenoid operated valve 54 is a spool-type valve with the spaced lands 54a and 54b interconnected by a reduced diameter neck portion. Land 54b can be provided with a resilient O-ring seal 87 that is primarily used to apply a friction load between the valve 54 and its bore 85. Connected to the upper end of the valve bore 85 is a sump port 88 and spaced below the sump port 88 is a port 89 that feeds a conduit 90. Conduit 90 is connected to the left end of the bore 86 for the differential pressure actuated piston 55. Adjacent the lower end of the bore 85 for the valve 54 is another port 92 that is adapted to drain fluid leakage back to the sump 23. Projecting through the lower end of the valve bore 85 is a plunger rod 93 that has its upper end 93a engaged with the lower end 54b of the valve 54. The lower end 93b of the plunger rod 93 is normally seated in the conduit 79. The lower end 93b of rod 93 is tapered so that it will never block off fluid flow through the conduit 79. The upper end land 54a of the valve 54 is arranged to be engaged by the lower end of the solenoid operated plunger rod 95. Rod 95 is normally urged downwardly by the compression spring 96 except when the solenoid 97 is energized. When solenoid 97 is energized then the plunger rod 95 is retracted upwardly to relieve the force on the upper end 54a of valve 54. At such a time if there is pressurized fluid in conduit 79 the plunger rod 93 will be urged upwardly to thereby shift valve 54 upwardly (see FIGS. 10 and 11). Solenoid 97 is energized only when this speed control device is conditioned for the automatic maintenance of a pre-selected control speed. This operation will be described in detail hereafter.

The differential pressure operated piston 55 that is reciprocably mounted in the cylinder bore 86 preferably is encircled by an O-ring type resilient seal 101. The piston connecting rod or stem 48 extends through the piston 55 and is shiftably connected thereto. Rod 48 is sealed against the bore through the piston 55 by the O-ring type resilient seal 102. The rod 48 has a reduced diameter inner end portion 48a that acts as a stop when the rod 48 is moved into engagement with the right end of cylinder bore 86. An enlarged collar or washer-like flange 48b is provided on the right end of rod 48 so that a differential pressure generated force can be applied to the right end of rod 48 tending to urge the rod leftwardly whenever the portion of the bore 86 to the right of the piston 55 is pressurized to a greater intensity than the bore portion on the left side of the piston 55. An O-ring type resilient seal 104 can also be used to seal the rod 48 against the casing 105 of the speed control device 52. From the foregoing description it is thought to be clear that when pressurized fluid is applied to only that portion of cylinder 86 on the right side of piston 55 (see FIGS. 6 and 7) then the piston 55 will be forced leftwardly against the left end of the bore 86 and the fluid pressure in bore 86 will merely act on the unbalanced portion of the right end 48a of the piston rod 48. Rod 48 is directly connected to the accelerator pedal 115 through the linkages 36—38 and 40—44 so that this pressure fluid generated force resisting further depression of the accelerator pedal 115 can be felt by the vehicle operator. This pressure fluid resistance provides the governor type of speed sensing means that will be described in detail hereafter.

If pressurized fluid should be applied to each of the chambers of bore 86 on opposite sides of the piston 55 (see FIG. 10) then the piston 55 will be held in contact with enlarged collar 48b on rod 48 and the rod and piston 48, 55 will reciprocate in the bore 86 as a unit. This operation will be described in more detail hereafter when FIGS. 6–11 are separately described.

FIGS. 2 and 3 each show the vehicle operator's compartment with the service brake pedal 118 arranged to operate an electric circuit switch 121 that will be opened whenever the brake pedal 118 is depressed to apply the service brakes. Switch 121 (see FIG. 3) is a part of the vehicle ignition circuit and is connected by the conductor cable 123 to the switch 64 of the speed control handle member 61, 62. An electrical conductor cable 125 connects the speed control switch 64 to the vehicle engine ignition switch 127. An electrical conductor cable 128 connects the brake pedal operated switch 121 to the solenoid 97 of the speed control unit 52. From the foregoing description it is thought to be clear that the energization of the solenoid 97 is controlled by the ignition switch 127, the speed control setting handle switch 64 and the brake pedal switch 121 as these switches are arranged in series. FIG. 12 shows schematically the series circuit from the battery 130 to the ignition switch 127 and then through the handle switch 64 to the brake pedal switch 121 and finally to the solenoid 97. From this circuit it is obvious that applying the brakes, opening the handle switch 64 or turning off the ignition switch 127 will each deenergize the solenoid 97 so that valve 54 will be positioned in its lower position as shown in FIGS. 3 and 6–9. When each of the three switches 127, 64 and 121 are closed then the speed control 52 is set for automatic speed control and the solenoid 97 is energized so that plunger 96 is retracted upwardly to permit valve 54 to be raised to the position shown in FIGS. 10 and 11.

Operation of this speed control device as a speed indicator or speed sensing unit to advise the operator when a preselected vehicle speed has been attained will now be described. First the handle 62 is moved to the position along its scale indicating the particular speed at which the driver would like to receive a warning signal by an increased resistance to further accelerator depression. The switch 64 on handle 62 is left in an open or "in" position when this speed control device is being used merely as a speed indicator unit. After setting the speed selector handle 62 to the desired speed, the vehicle is started and operated in the conventional manner. When the vehicle attains the preselected speed there will be an increased resistance to accelerator depression which is the desired signal to the operator. If the operator should like or need to accelerate above the preselected speed he need only exert additional pressure on the accelerator pedal to overcome the increased resistance to accelerator depression. The pressure fluid operated mechanism for accomplishing this speed sensing signal function will now be described.

Looking first at FIG. 6, there is shown the condition of the elements of this speed control device 52 when a speed has been selected by handle 62 but the vehicle has not yet been accelerated up to the selected speed. The movement of the handle 62 to the selected speed caused the cable 57 to compressively load the upper end of valve 53 and urge it downwardly against the opposed "governor" pressure force applied to the lower end of valve 53. At this time, valve land 53c closes off the sump port 73 from the "line" pressure supply conduit 75. At the same time this positioning of valve land 53c opens up the connection between the "line" pressure supply conduit 75 and the conduit 77 that is connected to the bore 85 of the solenoid operated valve 54. Pressure fluid transmitted to the solenoid valve bore 85 is trapped in this bore 85 because the solenoid 97 is deenergized during speed sensing operations and this valve 54 remains in the position shown in FIG. 6. Accordingly no pressure fluid can be admitted to the left end of the cylinder bore 86 through conduit 90 during a speed sensing operation. With the valve 53 positioned as shown in FIG. 6, the valve land 53b prevents the connection of the "line" pressure supply conduit 75 to the conduit 78 so that there is no pressure fluid in the right end of cylinder bore 86 when the vehicle speed is below the preselected vehicle control speed. As the bore 86 is not pressurized, the piston rod 48 and its associated piston 55 can be moved freely by the accelerator pedal connected linkage 36—44 and vehicle operation is the same as if this speed control mechanism was non-existent.

When the vehicle attains the preselected indicator or control speed then the "governor" pressure applied to the lower end of valve 53 through port 72 will develop a sufficient force to overcome the opposing load of compressed spring 56 and the valve 53 will be moved upwardly to the position shown in FIG. 7. At this time the valve land 53b will be raised sufficiently to connect the "line" pressure supply conduit 75 to the conduit 79 that feeds the right end of the cylinder bore 86. "Line" pressure fluid, modulated by valve 53, is passed into the right end of cylinder bore 86 and will cause the piston 55 to move leftwardly relative to the rod 48 until the piston seats against the left end of the bore 86. There is no pressure fluid in the left end of cylinder bore 86 at this time because solenoid 97 is deenergized and valve 54 is positioned so that the left end of valve bore 86 is connected to the fluid sump 23 by conduit 90 and port 88. With modulated "line" pressure in the right end of bore 86 an unbalanced, leftwardly directed, pressure fluid generated force is applied to the right end of rod 48 that opposes any further depression of the accelerator pedal 115. At this time there is a physical signal to the operator that the vehicle has attained the preselected control speed and that he should not apply increased force to the accelerator unless he desires to accelerate the vehicle above the preselected control speed. The override of the presure fluid applied resistance to further acceleration can be easily accomplished as it does not require breaking any connection of parts or deenergizing any electrical circuits but merely requires the rightward movement of the right end 48a of rod 48 in the pressure fluid filled right end portion of the cylinder bore 86. Before describing override of the preselected control speed, it should be pointed out that the pressure fluid opposition to further accelerator depression, when the control speed is attained, provides a shelf or fluid stop against which the operator can more or less rest his foot if he wants to travel continuously at the preselected control speed. The fluid stop lets the driver retain complete speed control through his ability to either back off from this control speed accelerator position or override it by an increase in the force applied for accelerator depression.

FIG. 8 shows the condition of the several elements of this speed control unit when it is being used as a speed indicator or speed warning device and when the driver has intentionally depressed the accelerator 115 to override the fluid pressure speed warning stop so as to permit acceleration above the preselected control speed. The continued depression of the accelerator 115, after the fluid pressure resistance has been applied to the accelerator linkage by the pressurization of the right end of bore 86, is permitted because it merely involves the continued rightward movement of the end 48a of rod 48 towards the right end of cylinder bore 86 against the fluid force exterted on the rod end by pressurized fluid in bore 86. When it is desired to reduce the vehicle speed the operator need merely release the pressure applied to the accelerator 115 and as he backs off on the accelerator pressure he will feel a noticeable reduction in pedal resistance when the vehicle has decelerated to the preselected control speed. At this point the "governor" pressure has been reduced to such a value that valve 53 has moved downwardly to position land 53b (see FIG. 6) so that it closes off the "line" pressure supply to conduit 79. At the same time the right end of bore 86 is connected to sump 23 through conduit 79, port 78 and sump port 75. The fluid pressure load on the accelerator linkage has now been eliminated so the driver is notified that the vehicle has decelerated to below the preselected control speed.

It should be pointed out that when the vehicle speed has risen to such a value that conduit 79 is pressurized with modulated "line" pressure that the fluid pressure force on the lower end 93b (see FIGS. 7 and 8) is not sufficient to overcome the downwardly directed force of the compression spring 96 that is applied to the upper end 93a of plunger 93. Accordingly, stud 93 will never be raised upwardly by "line" pressure in conduit 79 when this speed control device is being used merely as a speed indicating or speed warning device. It is only when this speed control device is being utilized as an automatic speed control that the plunger 93 can reciprocate in its bore because at such a time the solenod 97 is energized and the force of spring 96 has been removed from the plunger 93. Fluid pressure in conduit 79 can then elevate plunger 93 as shown in FIGS. 10 and 11.

FIG. 9 shows the condition of the speed control unit members or elements when the unit has been conditioned for automatic speed control usage as when the operator desires to maintain a constant speed for a relatively long period of travel along an expressway or the like. First the vehicle operator will move the speed control handle 62 to the position along its dial 65 indicating the speed which it is desired to maintain. This loads spring 56 and valve 53. Then handle 62 is pulled outwardly towards the operator to close switch 64. When the ignition switch 127 is turned on then (see FIG. 12) a closed circuit is provided for energization of the solenoid 97 provided the service brakes are released so as to close switch 121. Energization of solenoid 97 retracts plunger 95 upwardly so as to compress spring 96 and relieve the spring load on the valve 54 and the plunger 93. While the speed control unit 52 has been conditioned for automatic control when the foregoing steps have been taken, still, there is no noticeable effect on normal vehicle operation until after the vehicle has been accelerated up to the preselected control speed. FIG. 9 is thought to bring out this fact because until the "governor" pressure applied to the lower end of valve 53 overcomes the load of compressed spring 56 applied to the upper end of the valve 53 the valve 53 is positioned so as to prevent the introduction of pressure fluid into the cylinder bore 86. Because valve 53 is positioned as shown in FIG. 9 until the control speed is attained, the valve land 53b prevents "line" pressure from entering conduit 78. Conduit 78 is connected to sump 23 by the port 74 until valve 53 is raised upwardly by the preselected "governor" pressure. While modulated "line" pressure can enter conduit 77 when the control device is conditioned as shown in FIG. 9, still, this "line" pressure cannot pass through solenoid valve bore 85 and into conduit 90 because the valve 54 blocks flow passage through bore 85. Even though solenoid 97 has been energized and plunger 95 retracted away from the top of valve 54, still there is no pressure fluid in conduit 79 to produce an upwardly directed force on valve 54. Also, the resilient O-ring seal 87 on the lower land 54b of valve 54 provides a friction fit with valve bore 85 that resistrains the valve 54 against free floating movement. Accordingly, until the vehicle is first brought up to the preselected control speed, this speed control unit 52 has no effect whatever on the operation of the vehicle even though the system for the automatic speed control has been conditioned for operation by closing switch 64 and selecting the control speed by handle 62.

Once the vehicle is brought up to the preselected control speed, after conditioning the unit for automatic speed control, then the automatic controls take over and maintain the vehicle operating at the preselected speed regardless of variation in road condition or elevation, wind load, or any other external factors that might affect vehicle speed changes. FIG. 10 shows the condition of the parts of the speed unit 52 after the vehicle has been conditioned for automatic speed control and after it has been brought up to the preselected speed. The "governor" pressure applied to the lower end of valve 53 has raised the valve 53 upwardly so that "line" pressure now is metered through ports 76 and 78 to each of conduits 77 and 79. "Line" pressure modulated by valve 53 and passed into conduit 79 is applied to the right end of piston 55 and it also acts on the lower end 93b of plunger 93 to cause valve 54 to be raised so that this same "line" pressure in conduit 77 can now pass through valve bore 85 and into conduit 90 so as to be applied to the left side of piston 55. With the application of this substantially constant intensity "line" pressure to each of the chambers of bore 86 on opposite sides of the piston 55, a fluid pressure means is provided that latches the piston 55 and linkage 48, 36—43, 116 in the throttle valve position that maintains the preselected control speed. If due to hills or winds the vehicle speed should fall below the preselected control speed during operation under automatic speed control, then the "governor" pressure applied to the lower end of valve land 53d will drop and permit the compressed spring 56 to urge the valve 53 downwardly so as to close off "line" pressure flow through port 78 while opening up the port 76 for increased "line" pressure flow. At the same time that conduit 79 is cut off from the supply of "line" pressure it is also connected to the sump port 74 so that the pressure fluid force applied to the right side of piston 55 is reduced. With increased fluid flow through conduits 77, 85 and 90 to the left side of piston 55 the piston 55 will be moved rightwardly to cause rod 48 to open up the throttle valve 120 so that the vehicle will be speeded up to automatically resume the preselected control speed. When the control speed is attained then the valve 53 is positioned as shown in FIG. 10 with "line" pressure fluid being metered through each of ports 76, 78 to both sides of the piston 55 in bore 86. Variations in vehicle speed which cause changes in the "governor" pressure cause the valve 53 to reciprocate slightly thereby changing the balance of fluid pressure in the actuating cylinder bore 86, which adjusts the throttle valve linkage 48, 36—43, 116.

If while operating under automatic speed control at the preselected speed, the vehicle should travel down a hill or have a tailwind assist force applied so that the vehicle speed is temporarily increased above the control speed, then the control unit 52 functions in the reverse manner to that described hereinbefore. The increase in vehicle speed above the control speed will cause the valve 53 to be raised by the increased "governor" pressure applied to valve land 53d. This raising of valve 53 will close off supply of "line" pressure fluid to port 76 and will connect the conduit 77 to the sump port 73 so that the pressure fluid force applied to the left end of piston 55 is reduced. At the same time raising of valve 53 by the increased "governor" pressure opens up port 78 for "line" pressure flow through conduit 79 to the right side of piston 55. The increased fluid force applied to the right side of piston 55 urges the piston rod 48 leftwardly so that the attached throttle valve linkage 36—43, 116 will cause the throttle valve 120 to be closed a little to reduce vehicle speed. When the vehicle speed has been reduced to the preselected control speed then the valve 53 will be returned to the balanced condition shown in FIG. 10 and the control speed is once again resumed.

FIG. 11 shows the condition of the ports of the speed control unit 52 when it is set for automatic speed control and when, due to some emergency or other reason, the vehicle operator decides to accelerate above the preselected control speed. Increased speed can be achieved at the will of the operator because application of an increased pressure on the accelerator pedal 115 will merely force the piston rod 48 rightwardly from its FIG. 10 position so that rod 48 moves relative to the piston 55. As soon as the operator removes his foot from the accelerator the fluid pressure in the right end of bore 86 will force the rod end 48a leftwardly until it seats against the piston 55 after which the rod 48 and piston 55 are automatically operated as a unit by the changes in balance of the pressure fluid forces applied to opposite sides of the piston 55. It should be pointed out that while the control unit 52 is set for use as an automatic speed control, still, the vehicle operator can override the accelerator control and increase the vehicle speed at any time by merely depressing the accelerator. This override does not destroy the automatic control setting because immediately upon release of pressure from the accelerator the automatic control is reestablished. Likewise, the vehicle speed can be reduced at any time by merely applying the service brakes by a depression of the brake pedal 18. Depression of the brake pedal 118 not only applies the service brakes but it also opens the switch 121 so as to break the energizing circuit for the solenoid 97. Deenergizing the solenoid 97 causes the plunger 95 to be ejected downwardly so as to push valve 54 downwardly to the position shown in FIGS. 6–8. With valve 54 in the depressed position, the left end of cylinder bore 86 will be connected to sump 23 through conduit 90, valve bore 85 and port 88. This relieves the fluid force on the piston rod 48 and associated accelerator pedal linkage that is urging the throttle valve 120 to an open position. At the same time the pressure fluid in the bore chamber on the right side of piston 55 will be unbalanced and it will act to move the rod 48 leftwardly to close the engine throttle valve during braking. Accordingly, when the brakes are applied the automatic throttle control mechanism is rendered inoperative so that the brakes may have maximum effectiveness. As the vehicle speed drops during braking, the "governor" pressure is reduced and the valve 53 will be lowered in its bore 71 to a position such as that shown in FIG. 9 wherein modulated "line" pressure is cut off from the actuator cylinder bore 86. Thereupon the effect of the speed control device 52 is removed from action on the accelerator linkage until depression of the brake pedal 118 is released. When the brake pedal depression is terminated the switch 121 is closed and the circuit for energization of solenoid 97 is reestablished. If the vehicle speed has dropped below the preselected control speed during braking, then valve 53 will be positioned as shown in FIG. 9 and the automatic speed control function of device 52 will not become active until after the vehicle operator has accelerated the vehicle up to the control speed. At this time the automatic control system will automatically take over operation of the throttle valve 120 and the operator can once again remove his foot from the accelerator pedal for a relaxing constant speed drive of his vehicle by the speed control device 52.

While the operation of this speed control device 52 has been described with respect to bringing it into operation at the beginning of vehicle operation or on starting drive, still, it should be obvious that the unit 52 can be activated at any time either before or during vehicle operation. Normally, to prevent interference with full driver control of the vehicle, the handle 62 of the control device 52 is moved over to the maximum speed setting on the dial 65 and this will spring load the valve 53 such that the device 52 could not be activated until after a vehicle speed in excess of 100 miles per hour had been attained. At the same time the automatic speed control switch 64 is normally left in the inwardly positioned "off" position so as to prevent energization of the solenoid 97 except at such a time as the operator intentionally desires the automatic speed control function to be brought into existence. Thus it will be seen that this control device 52 is arranged so that its functions can be easily avoided to give the vehicle operator complete control of the vehicle without danger of interference from the speed control unit except at such times as he might desire the assistance of the unit as either a speed warning device or an automatic speed control mechanism. The speed control unit 52 is designed in such a manner that it will fail safe because on failure of the vehicle hydraulic or electrical systems the valving of unit 52 is so arranged that the actuator cylinder 86 will be connected to sump, the hydraulic forces on the actuator rod and piston 48, 55, eliminated, and the throttle valve urged to closed position by the accelerator pedal return spring.

Another feature of this invention that should be pointed out is that once the automatic speed control has been activated that thereafter the control handle 62 can be used as a hand operated throttle valve control to vary the speed at which the vehicle should travel. Likewise, the preselected speed can be varied by adjustment of the handle 62 when the speed control unit 52 is being used merely as a speed warning device.

It is thought to be clear from the foregoing description of this invention that even when the vehicle speed control unit has been selected for automatic speed control operation that, still, the control unit 52 will not initially bring the vehicle up to the preselected speed but will only go into operation to maintain that speed after the vehicle operator has manually brought the vehicle up to the preselected speed. This is an important safety feature because it prevents uncontrolled acceleration from a standing start.

It is also thought to be clear that this speed control device is inoperative except when the vehicle transmission is conditioned for a forward drive ratio because in neutral or reverse drive there will not be a "governor" pressure fluid available and this operating medium is necessary for functioning of this speed control device either as a speed warning mechanism or as an automatic speed control.

We claim:

1. In combination with a throttle controlled, engine driven, vehicle transmission unit having a source of relatively constant intensity pressure fluid and a source of vehicle speed responsive pressure fluid associated therewith, a vehicle speed sensing and speed control device comprising a first valve unit connected to each of said sources of pressure fluid and operable by the pressure variation of the vehicle speed responsive pressure fluid, a second manually controlled valve unit connected to said source of relatively constant intensity pressure fluid, and a cylinder bore having one end connected to said first valve unit and the other end connected to the second valve unit by conduit means arranged to apply said relatively constant intensity pressure fluid to the opposite ends of said cylinder bore under the selective control of said first and second valve units, a piston movably mounted in said cylinder bore, and a piston rod connected to said piston and to the throttle control for said vehicle engine, said piston rod connection to said piston providing for movement of said piston rod relative to said piston towards said one end of said cylinder bore and conjointly therewith towards said other end of said cylinder bore, pressurization of said one end of said cylinder bore with said relatively constant intensity pressure fluid applying a force to said piston rod that opposes throttle opening movement of said engine throttle control at a preselected vehicle speed.

2. In a combination as set forth in claim 1 wherein said second valve unit is an electrically actuated valve operator.

3. In a combination as set forth in claim 1 wherein the said first valve unit has manually operated resilient means to preload the valve of the first valve unit to determine at what vehicle speed the vehicle speed responsive pressure fluid applied to said first valve unit will activate the combination vehicle speed sensing and automatic speed control unit.

4. In combination with a throttle controlled, engine driven, vehicle transmission unit having a source of relatively constant intensity pressure fluid and a source of vehicle speed responsive pressure fluid associated therewith, a vehicle speed sensing and speed control device comprising a first valve unit connected to each of said sources of pressure fluid and operable by the pressure variation of the vehicle speed responsive pressure fluid, a second manually controlled valve unit connected to said source of relatively constant intensity pressure fluid, and a cylinder bore having one end connected to said first valve unit and the other end connected to the second valve unit by conduit means arranged to apply said relatively constant intensity pressure fluid to the opposite ends of said cylinder bore under the selective control of said first and second valve units, a piston movably mounted in said cylinder bore, and a piston rod connected to said piston and to the throttle control for said vehicle engine, said piston rod connection to said piston providing for movement of said piston rod relative to said piston towards said one end of said cylinder bore and conjointly therewith towards said other end of said cylinder bore, pressurization of said one end of said cylinder bore with said relatively constant intensity pressure fluid applying a force to said piston rod that opposes throttle opening movement of said engine throttle control at a preselected vehicle speed and pressurization of the opposite ends of said cylinder bore with said constant intensity fluid operating to automatically control movement of said engine throttle control to maintain a preselected vehicle speed after said preselected vehicle speed has once been attained.

5. In combination with a throttle controlled, engine driven, vehicle transmission unit having a source of relatively constant intensity pressure fluid and a source of vehicle speed responsive pressure fluid associated therewith, a vehicle speed sensing and speed control device comprising a first valve unit connected to each of said sources of pressure fluid and operable by the pressure variation of the vehicle speed responsive pressure fluid, a second manually controlled valve unit connected to said source of relatively constant intensity pressure fluid, and a cylinder bore having one end connected to said first valve unit and the other end connected to the second valve unit by conduit means arranged to apply said relatively constant intensity pressure fluid to the opposite ends of said cylinder bore under the selective control of said first and second valve units, a piston movably mounted in said cylinder bore, and a piston rod connected to said piston and to the throttle control for said vehicle engine, said piston rod connection to said piston providing for movement of said piston rod relative to said piston towards said one end of said cylinder bore and conjointly therewith towards said other end of said cylinder bore, pressurization of said one end of said cylinder bore with said relatively constant intensity pressure fluid applying a force to said piston rod that opposes throttle opening movement of said engine throttle control at a preselected vehicle speed and pressurization of the opposite ends of said cylinder bore with said constant intensity fluid operating to automatically control movement of said engine throttle control to maintain a preselected vehicle speed after said preselected vehicle speed has once been attained, said second valve unit having vehicle brake pedal actuated means associated therewith to provide for termination of the automatic control of the engine throttle means whenever the brake pedal is operated to apply the vehicle brakes.

6. A combination vehicle speed sensing and automatic vehicle speed control unit adapted to be applied to the transmission unit of a throttle valve controlled, engine driven vehicle having a source of relatively constant intensity pressure fluid and a source of vehicle speed responsive pressure fluid associated therewith, comprising a first valve unit having a speed control valve reciprocably mounted in a valve bore, manually adjustable, resiliently applied means for loading one end portion of said speed control valve, conduit means applying vehicle speed responsive pressure fluid to the other end portion of said speed control valve to oppose said resiliently applied loading, conduit means applying said constant intensity pressure fluid to the valve bore of said first valve unit, a pair of outlet ports connected to the valve bore of said first valve unit, a sump connection to the valve bore of the first valve unit, axial movement of said speed control valve in its bore under the influence of the opposed forces applied to its ends controlling passage of said constant intensity pressure fluid to said outlet ports of said first valve unit, a second valve unit having a flow control valve reciprocably mounted in the valve bore thereof, conduit means connecting one of said outlet ports of the first valve unit to the valve bore of the second valve unit, an outlet port from the valve bore of the second valve unit, a manually controlled, solenoid actuator to control reciprocation of the flow control valve in the valve bore of the second valve unit, a sump port connected to the valve bore of the second valve unit, a cylinder bore having a piston axially reciprocable therein, conduit means connecting one of the outlet ports of the first valve unit to one end of said cylinder bore, conduit means connecting the outlet port of the second valve unit to the other end of said cylinder bore, and a piston rod connected to said piston and adapted for connection to the throttle valve control for the engine to be associated therewith.

7. In a speed control unit as set forth in claim 6 wherein the piston rod connection to the piston provides for movement of said piston rod relative to said piston towards said one end of the cylinder bore and conjointly with said piston towards said other end of said cylinder bore.

8. In a speed control unit as set forth in claim 7 wherein pressurization of said one end of said cylinder bore with said relatively constant intensity pressure fluid applies a force to said piston rod that opposes throttle valve opening movement at a preselected vehicle speed.

9. In a speed control unit as set forth in claim 6 wherein pressurization of both ends of said cylinder bore with said constant intensity pressure fluid operates to automatically control movement of the associated engine throttle valve control so as to maintain a preselected vehicle speed after said preselected speed has once been attained.

10. In a speed control unit as set forth in claim 6 wherein an electrical circuit including a vehicle brake pedal operated switch is included for control of the solenoid actuator associated with the flow control valve of the second valve unit.

11. In a speed control unit as set forth in claim 10 wherein a vehicle operator switch and the brake pedal operated switch are arranged in series.

12. A combination vehicle speed indicating and automatic speed control device adapted to be connected to a throttle controlled, engine driven, vehicle power transmission unit having a control system including a source of relatively constant intensity pressure fluid and a source of variable intensity pressure fluid responsive to vehicle speed, said device comprising a first valve unit having a bore with a vehicle speed control, multi-land, spool-type, valve therein, a manually adjustable, resiliently applied force and a vehicle speed responsive pressure fluid generated force applied to said speed control valve in opposed relationship, said opposed forces controlling movement of the vehicle speed control valve in its valve bore, a supply of relatively constant intensity pressure fluid connected to the bore of said first valve unit, a pair of axially spaced outlet ports and a pair of sump ports connected to the bore of said first valve unit, movement of said vehicle speed control valve in its valve bore controlling flow of said constant intensity pressure fluid through said first valve unit bore to the outlet ports of said first valve unit, a second valve unit having a valve bore with a solenoid actuated valve therein, conduit means connecting one of the outlet ports of said first valve unit to the valve bore of said second valve unit, an outlet port connected to said second valve unit bore, a cylinder bore having an axially shiftable piston therein, conduit means connecting the other outlet port of said first valve unit to one end portion of said cylinder bore, conduit means connecting the outlet port of said second valve unit to the other end of said cylinder bore, and a piston rod having one end connected to said piston, said connection providing for axial movement of the rod relative to the piston in one direction and conjointly therewith in the opposite direction, the other end of said piston rod being adapted for connection to the throttle control for the vehicle engine driving the power transmission unit.

13. A speed control unit for use with a throttle controlled, engine driven, vehicle transmission unit having a source of relatively constant intensity pressure fluid and a source of variable intensity, vehicle speed responsive, pressure fluid associated therewith, comprising a first manually adjustable, control speed selector valve unit connected to each of said sources of pressure fluid and operable by the pressure variation of the vehicle speed responsive pressure fluid, a second manually controlled valve unit connected to said source of relatively constant intensity pressure fluid through said first valve unit, and a cylinder bore having one end connected to said first valve unit and the other end connected to the second valve unit by conduit means, said valve units being arranged to apply said relatively constant intensity pressure fluid to one or both ends of said cylinder bore under the selective manual operation of said first and second valve units, a piston movably mounted in said cylinder bore, and a piston rod connected to said piston and directly connected to the throttle control for said vehicle engine, said piston rod connection to said piston providing for movement of said piston rod relative to said piston towards said one end of said cylinder bore and conjointly therewith towards said other end of said cylinder bore, movement of said piston rod in said cylinder bore being opposed by the relatively constant intensity pressure fluid applied to the cylinder bore after the control speed selected by said first valve unit has been attained.

14. A vehicle speed sensing unit adapted to be applied to the transmission unit of a throttle valve controlled, engine driven vehicle having a source of relatively constant intensity pressure fluid and a source of variable intensity vehicle speed responsive pressure fluid associated therewith, comprising a first manually adjustable, control speed selector valve unit having a speed control valve reciprocably mounted in a valve bore, manually adjustable, resiliently applied means for loading one end portion of said speed control valve, conduit means applying vehicle speed responsive pressure fluid to the other end portion of said speed control valve to oppose said resiliently applied loading, conduit means applying said constant intensity pressure fluid to the valve bore of said first valve unit, an outlet port connected to the valve bore of said first valve unit, a sump connection to the valve bore of the first valve unit, axial movement of said speed control valve in its bore under the influence of the opposed forces applied to its ends controlling passage of said relatively constant intensity pressure fluid to said outlet port of said first valve unit, a cylinder bore having a piston axially reciprocable therein, conduit means connecting the outlet port of the first valve unit to one end of said cylinder bore, and a piston rod connected to said piston and adapted for direct connection to the throttle valve control for the engine to be associated therewith, said piston rod connection to said piston providing for movement of said piston rod relative to said piston towards said one end of said cylinder bore and conjointly therewith towards said other end of said cylinder bore, movement of said piston rod in said cylinder bore being opposed by the relatively constant intensity pressure fluid applied to the cylinder bore after the control speed selected by said first valve unit has been attained.

References Cited in the file of this patent
UNITED STATES PATENTS

| | | |
|---|---|---|
| 2,765,800 | Drake | Oct. 9, 1956 |
| 2,972,391 | Faiver et al. | Feb. 21, 1961 |
| 3,062,310 | McCathron et al. | Nov. 6, 1962 |